United States Patent
Keller et al.

(10) Patent No.: US 7,494,317 B2
(45) Date of Patent: Feb. 24, 2009

(54) RING SEAL ATTACHMENT SYSTEM

(75) Inventors: Douglas A. Keller, Kalamazoo, MI (US); David C. Radonovich, Winter Park, FL (US)

(73) Assignee: Siemens Energy, Inc., Orlando, FL (US)

( * ) Notice: Subject to any disclaimer, the term of this patent is extended or adjusted under 35 U.S.C. 154(b) by 502 days.

(21) Appl. No.: 11/165,367

(22) Filed: Jun. 23, 2005

(65) Prior Publication Data

US 2006/0292001 A1 Dec. 28, 2006

(51) Int. Cl.
*F01D 11/08* (2006.01)
*F01D 25/26* (2006.01)

(52) U.S. Cl. .................... 415/136; 415/135; 415/173.1; 415/173.3

(58) Field of Classification Search ......... 415/135–136, 415/138–139, 173.1, 173.2, 173.3, 173.4, 415/173.5
See application file for complete search history.

(56) References Cited

U.S. PATENT DOCUMENTS

| | | | | |
|---|---|---|---|---|
| 2,494,178 | A | * | 1/1950 | Imbert ......................... 415/136 |
| 2,638,743 | A | * | 5/1953 | Feilden ........................ 415/134 |
| 3,807,891 | A | | 4/1974 | McDow et al. |
| 3,829,233 | A | | 8/1974 | Scalzo et al. |
| 3,867,063 | A | | 2/1975 | Bulavin et al. |
| 4,131,388 | A | * | 12/1978 | Brodell ........................ 415/138 |
| 4,274,805 | A | | 6/1981 | Holmes |
| 4,337,016 | A | | 6/1982 | Chaplin |
| 4,551,064 | A | | 11/1985 | Pask |
| 4,566,851 | A | | 1/1986 | Comeau et al. |
| 4,576,548 | A | * | 3/1986 | Smed et al. .................. 415/137 |
| 5,192,185 | A | | 3/1993 | Leonard |
| 5,330,321 | A | | 7/1994 | Roberts et al. |
| 6,382,905 | B1 | * | 5/2002 | Czachor et al. ................ 415/9 |
| 6,463,729 | B2 | | 10/2002 | Magoshi et al. |
| 6,513,781 | B1 | | 2/2003 | Meyer et al. |
| 6,726,446 | B2 | | 4/2004 | Arilla et al. |
| 2004/0005216 | A1 | * | 1/2004 | Suzumura et al. ......... 415/173.3 |
| 2004/0062639 | A1 | | 4/2004 | Glynn et al. |
| 2004/0062640 | A1 | | 4/2004 | Darkins, Jr. et al. |
| 2004/0071548 | A1 | | 4/2004 | Wilson, Jr. |

FOREIGN PATENT DOCUMENTS

| | | | |
|---|---|---|---|
| EP | 0 382 333 A1 | 8/1990 | |
| EP | 1 529 926 A2 | 5/2005 | |
| JP | 58-206807 A | * 12/1983 | ............... 415/173.3 |

* cited by examiner

*Primary Examiner*—Christopher Verdier

(57) ABSTRACT

A system for attaching a ring seal to a vane carrier in a turbine engine can allow the ring seal to radially expand and contract at least partially independently of the vane carrier. The system can also be configured to substantially restrict axial and/or circumferential movement of the ring seal. In one embodiment, the ring seal can include a plurality of radial slots circumferentially spaced about the ring seal. A pin can extend substantially through each of the slots and into operative engagement with isolation rings, which are connected to the vane carrier. In another embodiment, the ring seal and the isolation rings can include a series of axially-extending protrusions extending substantially circumferentially about each component. The protrusions on the ring seal can substantially matingly engage the protrusions on the isolation rings. The protrusions can be configured as a Hirth coupling.

16 Claims, 12 Drawing Sheets

RING SEAL ATTACHMENT SYSTEM

FIELD OF THE INVENTION

Aspects of the invention relate in general to turbine engines and, more particularly, to ring seals in the turbine section of a turbine engine.

BACKGROUND OF THE INVENTION

FIG. 1 shows an example of one known turbine engine 10 having a compressor section 12, a combustor section 14 and a turbine section 16. In the turbine section 16, there are alternating rows of stationary airfoils 18 (commonly referred to as vanes) and rotating airfoils 20 (commonly referred to as blades). Each row of blades 20 is formed by a plurality of airfoils 20 attached to a disc 22 provided on a rotor 24, which includes a plurality of axially-spaced discs 22. The blades 20 can extend radially outward from the discs 22 and terminate in a region known as the blade tip 26. Each row of vanes 18 is formed by attaching a plurality of airfoils 18 to a blade ring or vane carrier 28. The vanes 18 can extend radially inward from the inner peripheral surface 30 of the vane carrier 28. The vane carrier 28 is attached to an outer casing 32, which encloses the turbine section 16 of the engine 10.

Between the rows of vanes 18, a ring seal 34 can be attached to the inner peripheral surface 30 of the vane carrier 28. The ring seal 34 acts as the hot gas path guide between the rows of vanes 18 at the locations of the rotating blades 20. The ring seal 34 can be formed by a plurality of ring segments. Some turbine engines use metal ring segments that attach directly to the vane carrier 28, such as by bolts or by providing hooks on the ring seal that are received in a mating slot in the vane carrier 28. In other engine designs, the individual ring segments can be indirectly attached to the vane carrier 28. For example, metal isolation rings (not shown) can be attached to and extend radially inward from the vane carrier 28, and the ring segments can be fixed to the isolation rings by, for example, one or more fasteners. Each ring seal 34 can substantially surround a row of blades 20 such that the tips 26 of the rotating blades 20 are in close proximity to the ring seal 34. The space between the blade tips 26 and the ring seal 34 is referred to as the blade tip clearance C.

In operation, hot gases from the combustor section 14 are routed to the turbine section 16. The gas flows through the rows of stationary airfoils 18 and rotating airfoils 20 in the turbine section 16. Gas leakage can occur through the blade tip clearances C, resulting in measurable decreases in engine power and efficiency. Thus, it is preferred if the blade tip clearances C are kept as small as possible to minimize such gas leakage. However, it is critical to maintain a clearance C at all times; rubbing of any of the rotating and stationary components can lead to substantial component damage, performance degradation, and extended downtime.

During transient operating conditions such as engine startup or part load operation, it can be difficult to ensure that adequate blade tip clearances C are maintained because the rotating parts and the stationary parts thermally expand at different rates. As a result, the blade tip clearances C can actually decrease during transient engine operation, raising concerns of blade tip rubbing.

The blade tip clearances C can further be affected by the differing rates of thermal expansion of the stationary components. In particular, the ring seal 34 is a relatively thin component compared to the other stationary components to which it is operatively connected (i.e., the vane carrier 28 and the outer casing 32). Thus, while the ring seal 34 itself may be able to respond relatively rapidly to operational temperature increases, further radial movement and/or expansion of the ring seal 34 can be impeded by the relatively slower thermal response of the vane carrier 28 and/or outer casing 32.

Eventually, the outer casing 32 and the vane carrier 28 become sufficiently heated and expand radially outward. Because the ring seal 34 is connected to the vane carrier 28 and outer casing 32, the radial expansion of the vane carrier 28 and outer casing 32 can move the ring seal 34 radially outward as well so as to increase the clearances C. At steady state engine operation, such as at base load, the clearances C can become overly large, thereby reducing the efficiency of the engine 10.

Management of blade tip clearances during engine operation is a longstanding issue with turbine engines; various systems and methods have been directed to that goal. For instance, an active clearance controller has been used to adjust the radial position of the ring seal 34 based on an on-line measurement of the tip clearance C. However, such active clearance control systems are complicated and expensive.

Thus, there is a need for a system that can facilitate the optimization of the operational turbine tip clearances C.

SUMMARY OF THE INVENTION

In one respect, aspects of the invention are directed to a system for attaching a vane carrier and a ring seal so that axial and circumferential movement of the ring seal is substantially restricted while relative radial movement between the ring seal and the vane carrier is permitted. The vane carrier has an inner peripheral surface. A forward isolation ring and an aft isolation ring are attached to the vane carrier such that the isolation rings extend substantially circumferentially about and substantially radially inward from the inner peripheral surface of the vane carrier. The aft isolation ring is spaced axially downstream of the forward isolation ring.

The ring seal has an outer periphery and an inner periphery. The ring seal has a plurality of substantially circumferentially spaced slots, which extend substantially axially through the ring seal and radially inward from the outer periphery. The system further includes a plurality of pins. Each pin substantially passes through a respective slot in the ring seal and operatively engages the forward and aft isolation rings. Thus, the ring seal is structurally connected to the vane carrier by the isolation ring and the pins. At least one of the slots and the pins can be at least partially coated with a wear resistant material; that is, either the slots or the pins or both have such a coating.

Each of the isolation rings can include a plurality of circumferentially spaced holes. The holes in the forward isolation ring can be substantially aligned with the holes in the aft isolation ring. The ring segment can be positioned such that each slot is substantially aligned with a pair of aligned holes in the isolation rings. Each pin can be received within the aligned holes of the isolation rings.

In one embodiment, the ring seal can include a forward span, an aft span and an axial extension connecting the forward and aft spans. The axial extension can define at least a part of the inner periphery of the ring seal. The ring seal can have a substantially U-shaped cross-section.

Each of the isolation rings can include an axial upstream surface and an axial downstream surface. Each of the spans of the ring seal can include an axial forward surface and an axial aft surface. Each pin can include a first end with a head and a second end.

In one embodiment, the ring seal can be positioned such that the downstream surface of the forward isolation ring opposes the forward surface of the forward span, and such that the aft surface of the aft span opposes the upstream surface of the aft isolation ring. In such case, the head of each pin can operatively engage one of the aft face of the aft isolation ring and the forward face of the forward isolation ring. The second end of the pin can be operatively connected to the other of the forward isolation ring and the aft isolation ring.

In another embodiment, the ring seal can be positioned such that the forward face of the forward span opposes the aft face of the forward isolation ring, and such that the forward face of the aft span opposes the aft face of the aft isolation ring. The head of each pin can operatively engage the aft face of the aft span, and the second end of the pin can be operatively connected to the forward isolation ring.

In yet another embodiment, the ring seal can be positioned such that the aft face of the forward span opposes the forward face of the forward isolation ring, and such that the aft face of the aft span opposes the forward face of the aft isolation ring. The head of each pin can operatively engage the aft face of the aft isolation ring, and the second end of the pin can be operatively connected to the forward isolation ring. The second end of the pin can extend through the forward isolation ring and at least partly into one of the slots in the ring seal.

The ring seal and the vane carrier can each be made of a material with an associated coefficient of thermal expansion. Ideally, the coefficient of thermal expansion of the ring seal is less than the coefficient of thermal expansion of the vane carrier. In one embodiment, the ring seal can be made of ceramic.

In another respect, aspects of the invention are directed to an attachment system. The system includes a vane carrier and a ring seal enclosed within the vane carrier. The ring seal is operatively connected to the vane carrier so that the vane carrier and the ring seal move at least partially independent of each other in the radial direction. In one embodiment, axial movement and/or circumferential movement of the ring seal can be substantially restricted.

The ring seal and the vane carrier can each be made of a material with an associated coefficient of thermal expansion. The coefficient of thermal expansion of the ring seal can be less than the coefficient of thermal expansion of the vane carrier. In one embodiment, the ring seal can be made of ceramic.

The vane carrier can have an inner peripheral surface. The ring seal can have an axial forward side and an axial aft side. A plurality of protrusions can extend substantially axially from and substantially circumferentially about each axial side of the ring seal.

The system can further include a forward isolation ring and an aft isolation ring spaced axially downstream of the forward isolation ring. The isolation rings can be attached to the vane carrier such that the isolation rings extend substantially circumferentially about and radially inward from the inner peripheral surface of the vane carrier. A plurality of protrusions can extend substantially axially from and substantially circumferentially about each of the isolation rings. The protrusions on the axial forward side of the ring seal can substantially matingly engage the protrusions on the forward isolation ring. The protrusions on the axial aft side of the ring seal can substantially matingly engage the protrusions on the aft isolation ring. In one embodiment, the substantially matingly engaging protrusions of the ring seal and the isolation rings can be configured as a Hirth coupling.

The isolation rings can be adapted to apply a clamping force on the ring seal. Each of the forward and aft isolation rings can include a front face and an aft face; the plurality of protrusions can be provided on the aft face of the forward isolation ring and the front face of the aft isolation ring.

In one embodiment, the system can further include a plurality of pins and a plurality of radial springs. Each of the pins can extend radially between and into operatively engagement with the ring seal and the vane carrier. Each spring can be located substantially proximate one of the pins. Each spring can operatively engage the vane carrier and the ring seal.

The ring seal can have an outer peripheral surface and can include a plurality of recesses extending radially inward from the outer peripheral surface. Each pin can have a first end and a second end. The first end of each pin can be connected to the vane carrier, and the second end of each pin can be received within one of the recesses in the ring seal. In one embodiment, the vane carrier can include a plurality of radial passages. At least a portion of each pin, including the first end, can be received within one of the passages. The pin and the passage can be connected by, for example, threaded engagement.

DETAILED DESCRIPTION OF EMBODIMENTS OF THE INVENTION

Embodiments of the invention are directed to a system for attaching a ring seal to a vane carrier. Aspects of the invention will be explained in connection with various attachment systems, but the detailed description is intended only as exemplary. Embodiments of the invention are shown in FIGS. 2-10, but the present invention is not limited to the illustrated structure or application. At the outset, it is noted that use herein of the terms "circumferential," "radial" and "axial" and variations thereof is intended to mean relative to the turbine.

According to aspects of the invention a ring seal can be operatively connected to the vane carrier so as to permit relative radial movement of the ring seal and vane carrier. Thus, the vane carrier and the ring seal can thermally expand and contract independently of each other in the radial direction. The ring seal and the vane carrier can further be configured to substantially restrain axial movement of the ring seal in the axial forward and/or axial rearward directions. Separately or in addition to such axial restraint, the ring seal and the vane carrier can be configured to substantially restrain circumferential movement of the ring seal in the clockwise and/or counter-clockwise directions. There are various manners in which such an attachment system can be achieved.

Figure 1:
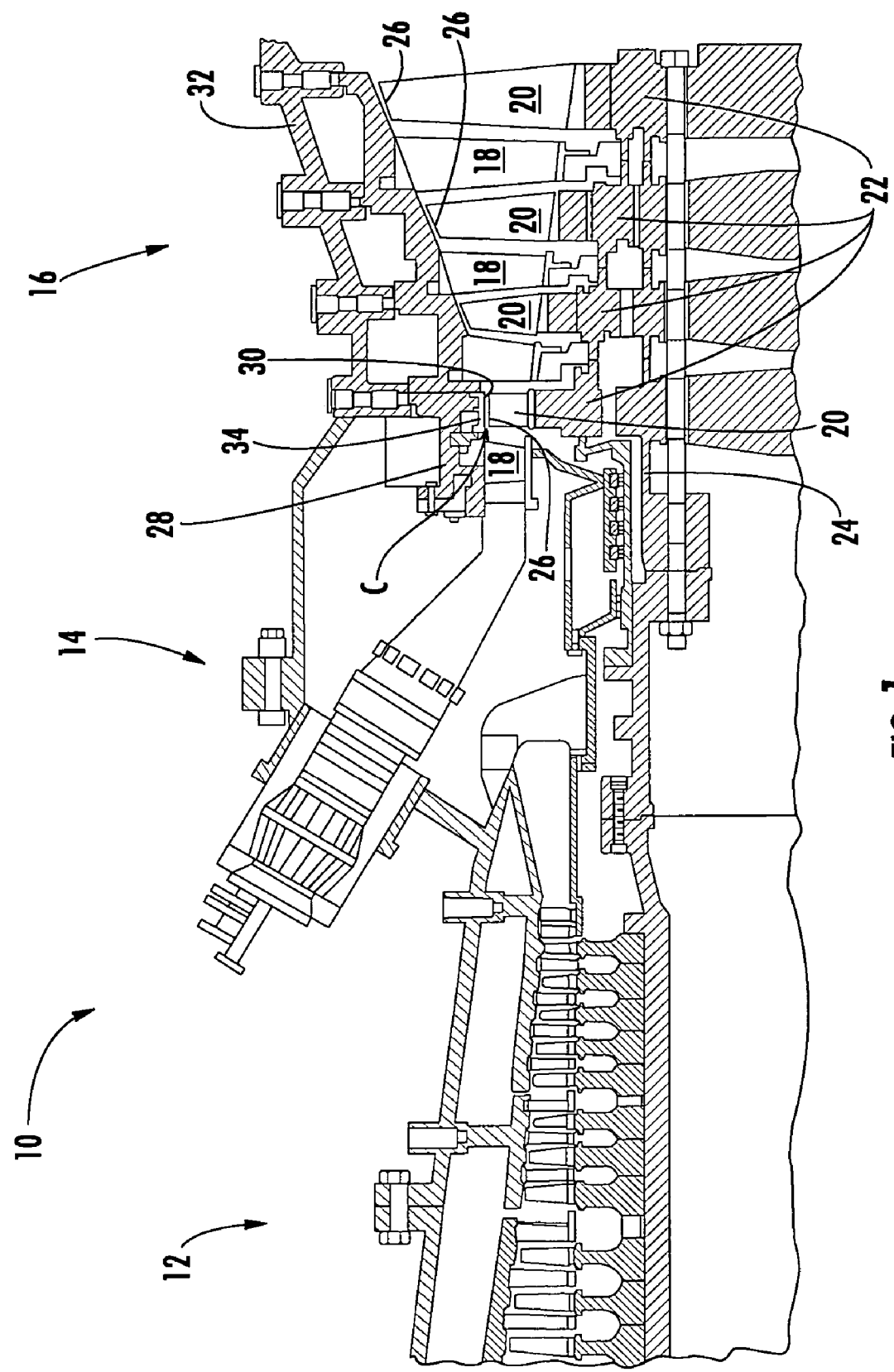
FIG. 1 is a cross-sectional view through a portion of a known turbine engine.
Figure 2:
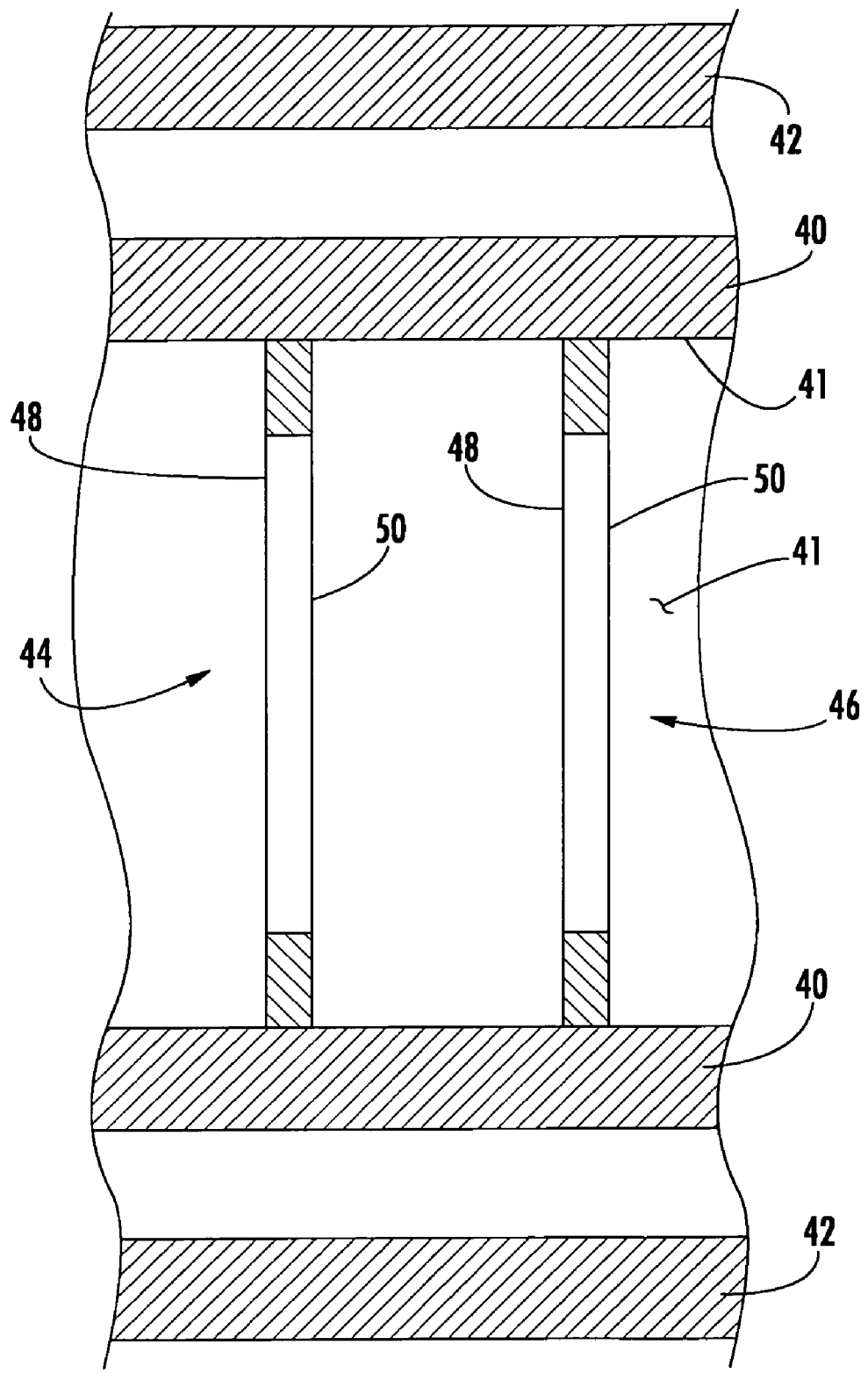
FIG. 2 is a cross-sectional view of a portion of the turbine section of an engine according to aspects of the invention, wherein various turbine components have been removed for purposes of clarity.

Details of a first attachment system according to aspects of the invention are shown in FIGS. 2-5. Each of the components of the system will be discussed in turn. Referring to FIG. 2, the vane carrier 40 can be attached to the turbine outer casing 42 in any of the manners known in the art. The vane carrier 40 has an inner peripheral surface 41. The vane carrier 40 can provide a forward isolation ring 44 and an aft isolation ring 46. The isolation rings 44, 46 and the vane carrier 40 can be a unitary construction, or the isolation rings 44, 46 can be attached to the vane carrier 40 in any of a number of known ways, such as by providing hooks (not shown) on the isolation rings 44, 46 that are received in a slot (not shown) provided in the vane carrier 40. Whatever the specific manner of attachment, the isolation rings 44, 46 can extend radially inward from the inner peripheral surface 41 of the vane carrier 40.

The isolation rings 44, 46 can extend about the entire inner peripheral surface 41 of the vane carrier 40; that is, the isolation rings 44, 46 can form a substantially 360 degree ring. The isolation rings 44, 46 can have various configurations. In one embodiment, each isolation ring 44, 46 can be a single piece. Alternatively, each isolation ring 44, 46 can be formed by two or more segments (not shown). For instance, two or more isolation ring segments can be substantially circumferentially abutted and/or can be joined by mechanical engagement or by one or more fasteners.

Each of the isolation rings 44, 46 can have a forward axial surface 48 and an aft axial surface 50. The forward and aft axial surfaces 48, 50 can be substantially flat, or they can include one or more protrusions, bends or other non-flat features. The isolation rings 44, 46 can have various cross-sectional shapes. In one embodiment, the portion of the isolation rings 44, 46 that extends radially inward from the inner peripheral surface 41 of the vane carrier 40 can be substantially rectangular, but other configurations are possible. The forward and aft isolation rings 44, 46 may or may not be substantially identical to each other at least in any of the above-described respects.

Figure 3:
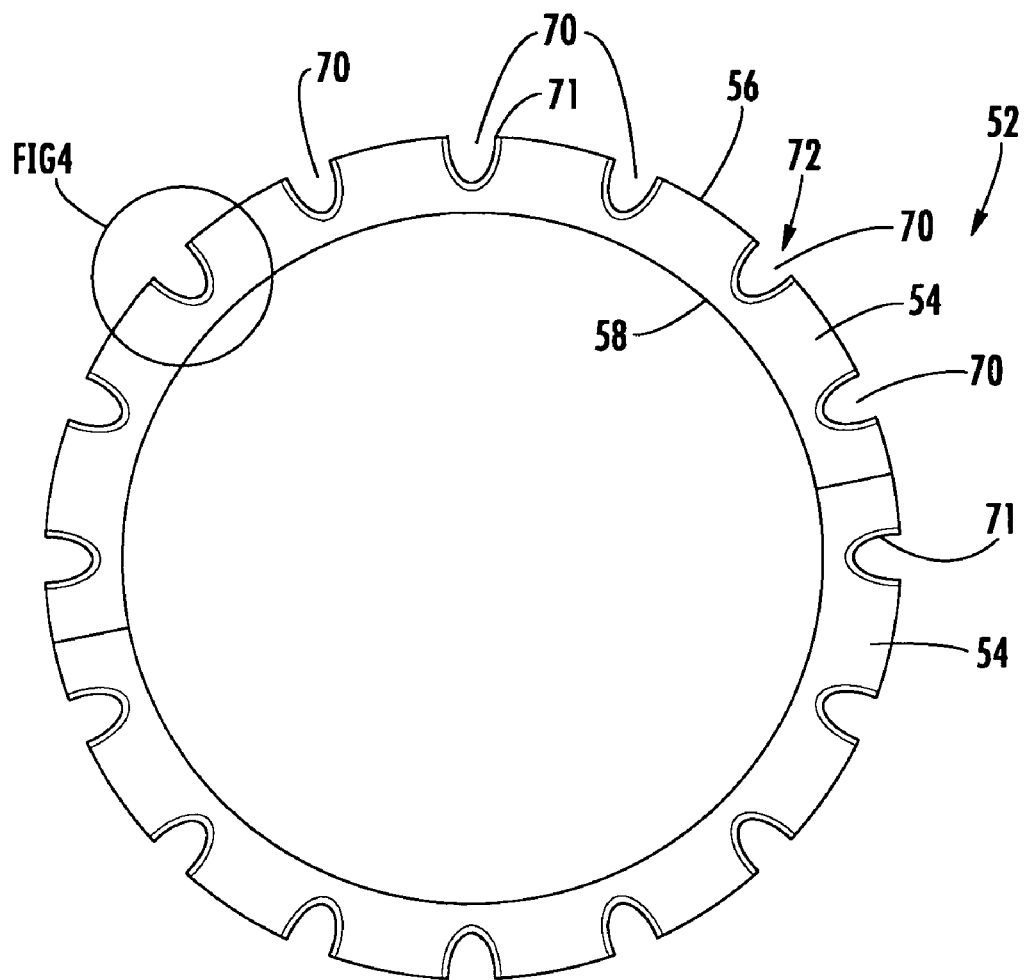
FIG. 3 is an elevational view of a ring seal according to a first embodiment of the invention.
Figure 4:
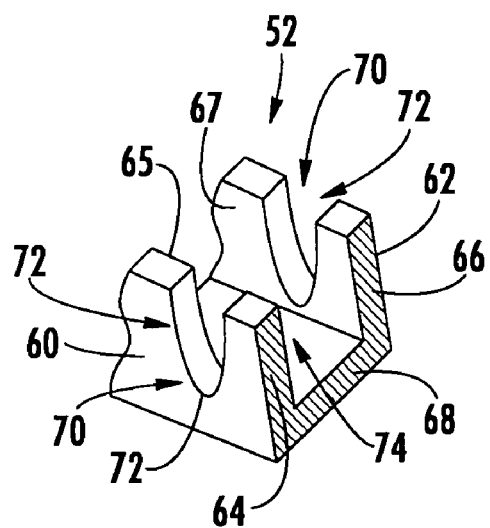
FIG. 4 is a isometric view of a portion of the ring seal of FIG. 2, showing one of the radial slots in the ring seal.

According to aspects of the invention, a ring seal 52 is attached to the vane carrier 40. One example of a ring seal 52 according to aspects of the invention is shown in FIGS. 3 and 4. The ring seal 52 can be formed by one or more ring segments 54. In cases where the ring seal 52 is made of two or more segments 54, the segments 54 can be substantially circumferentially adjacent to each other to form a ring. The individual segments 54 may or may not be connected to neighboring segments 54 by, for example, bolts or other fasteners. In one embodiment, shown in FIG. 3, the ring seal 52 can be made of two substantially 180 degree segments 54. The ring seal 52 can have a radial outer periphery 56 and a radial inner periphery 58.

The ring seal 52 can have an axial upstream surface 60 and an axial downstream surface 62. In one embodiment, the ring seal 52 can be substantially solid with a substantially rectangular cross-sectional shape. Alternatively, the ring seal 52 can be formed by a forward span 64 and an aft span 66 joined by a substantially axial extension 68. The forward span 64 can define the axial upstream face 60 of the ring segment 52 and can include an aft face 65. The aft span 66 can define the axial downstream surface 62 of the ring seal 52 and can include a forward face 67. The axial extension 68 can define the inner periphery 58 of the ring seal 52. As a result, the ring seal 52 can be generally U-shaped in cross-section, as shown in FIG. 4.

According to aspects of the invention, the ring seal 52 can have a plurality of slots 70 extending substantially radially inward from the outer periphery 56. When the ring seal 52 is U-shaped as generally shown in FIG. 4, the slots 70 can be formed by substantially aligned cutouts 72 in the forward and aft spans 64, 66. The slots 70 can also include a volume of space 74 between the cutouts 72 substantially bounded by a projection of each cutout 72 onto the opposite span 64 or 66.

Each of the slots 70 can extend radially inward substantially the same distance from the outer periphery 56. Preferably, the walls of the slots 70 are substantially smooth. There can be any quantity of slots 70. The slots 70 can have almost any conformation. In one embodiment, the slots 70 can be generally V-shaped. However, in other embodiments, the slots 70 can be substantially rectangular or semi-ovular. The slots 70 can be substantially identical in size and shape, or at least one of the slots 70 can be different in at least one of these aspects. The slots 70 can be arranged in various ways about the ring seal 52. For instance, the slots 70 can be substantially equally spaced. However, one or more slots 70 can be unequally spaced from the rest of the slots 70.

The ring seal 52 can be made of various materials. For instance, the ring seal 52 can be made of a metal alloy. In one embodiment, the ring seal 52 can be made of a material with a lower coefficient of thermal expansion than the material of the vane carrier 40 to which it is attached. For example, the ring seal 52 can be made of a ceramic material including ceramic matrix composites.

The ring seal 52 can be attached to the vane carrier 40 or by way of the forward and aft isolation rings 44, 46. According to aspects of the invention, the ring seal 52 can be attached to the isolation rings 44, 46 by a plurality of pins 76. The quantity of pins 76 can correspond to the quantity of slots 70 in the ring seal 52. The pins 76 can be made of any material. In one embodiment, the pins 76 can be made of the same material as the isolation rings 44, 46. The pins 76 can have almost any cross-sectional shape, such as circular, rectangular, triangular or polygonal, just to name a few possibilities. Preferably, the pins 76 are substantially straight. The pins 76 can be sized as needed. The pins 76 can include a first end 78 and a second end 80. The first end 78 of the pin 76 can include a head 82.

The pins 76 can interface with the isolation rings 44, 46 in various ways. For example, each of the forward and aft isolation rings 44, 46 can provide a plurality of substantially axially-extending openings 84, which may or may not extend completely through the isolation rings 44, 46. Each opening 84 in the forward isolation ring 44 can be sufficiently aligned with a respective opening 84 in the aft isolation ring 46 such that one of the pins 76 can be simultaneously received in each opening 84.

The pins 76 can engage the isolation rings 44, 46 in various ways. In one embodiment, the head 82 of the pin 76 can bear against the aft surface 50 of the aft isolation ring 46, and the second end 80 of the pin 76 can be secured to the forward isolation ring 44. In one embodiment, the second end 80 of the pin 76 can be secured to the forward isolation ring 44 by threaded engagement. Alternatively, the second end 80 of the pin 76 can be secured to the forward isolation ring 44 by fasteners such as a cotter pin, a nut or other retainer. It will be appreciated that the opposite arrangement can be provided in which the head 82 of the pin 76 can bear against the forward isolation ring 44, and the second end 80 of the pin 76 can be secured to the aft isolation ring 46, as described above and as is generally shown in FIG. 5D.

Figure 5A:
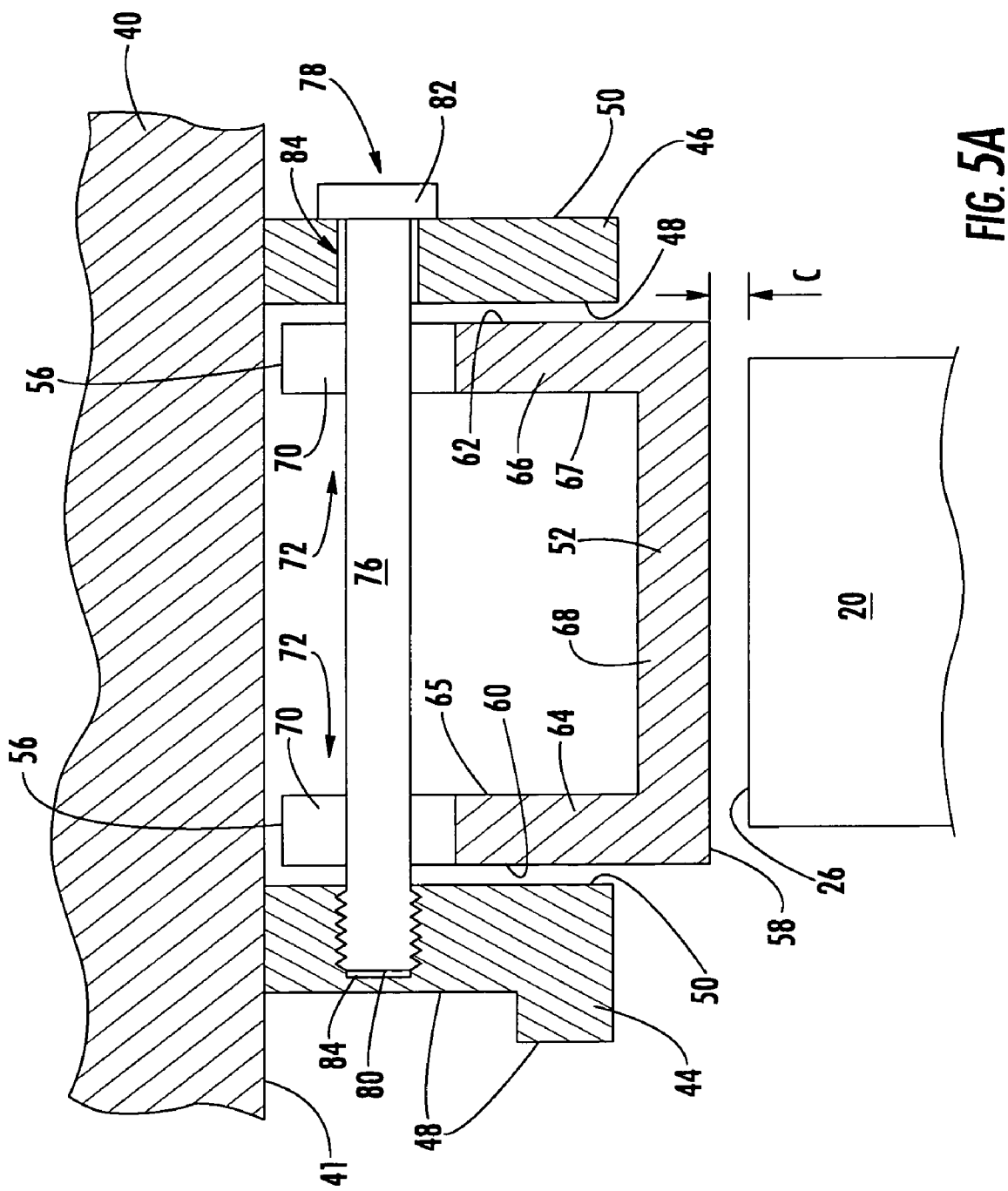
FIG. 5A is a cross-sectional view of one arrangement of a ring seal attachment system according to the first embodiment of the invention.
Figure 5B:
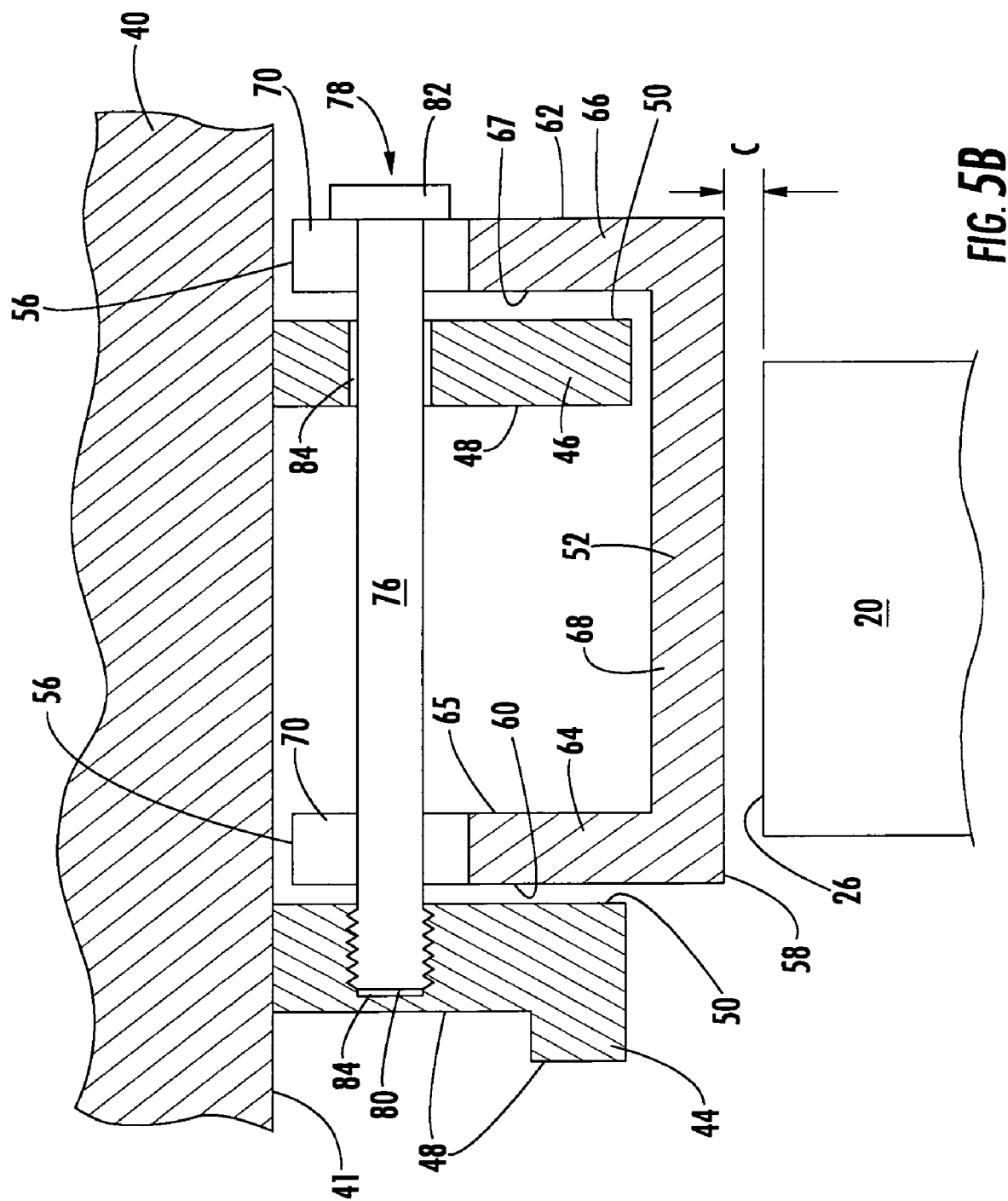
FIG. 5B is a cross-sectional view of an alternative arrangement of the ring seal attachment system according to the first embodiment of the invention.
Figure 5C:
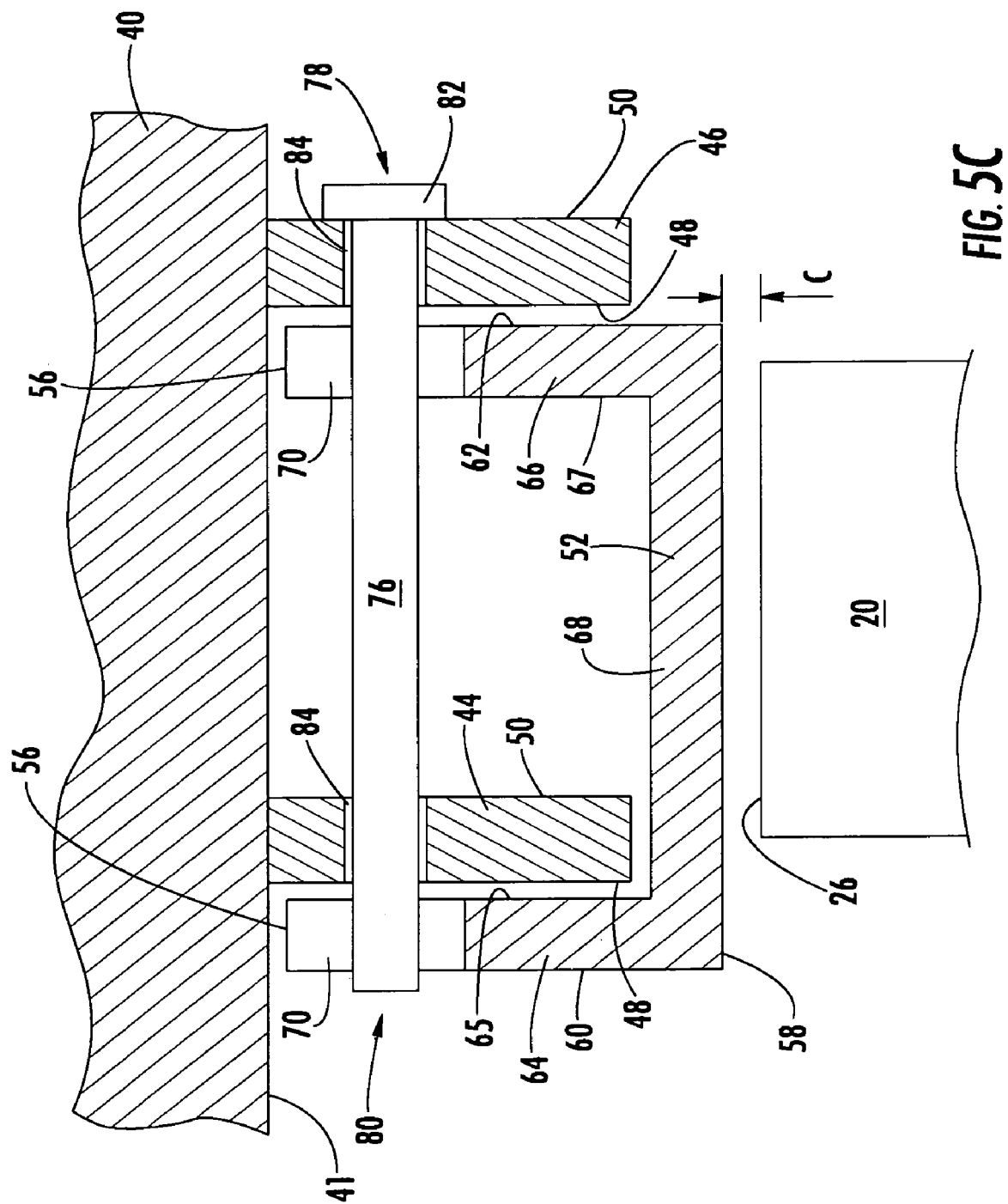
FIG. 5C is a cross-sectional view of another alternative arrangement of the ring seal attachment system according to the first embodiment of the invention.
Figure 5D:
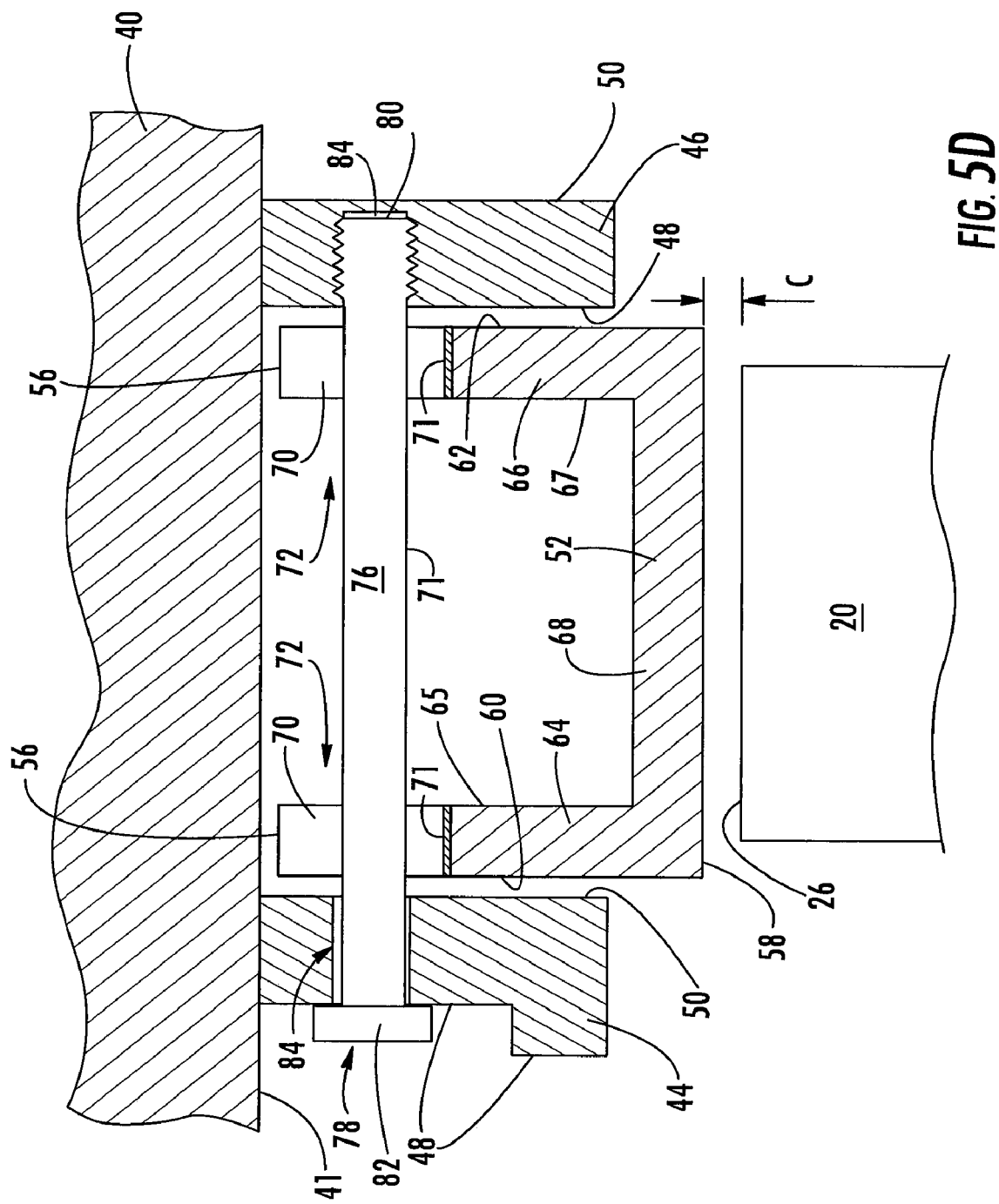
FIG. 5D is a cross-sectional view of still another alternative arrangement of the ring seal attachment system according to the first embodiment of the invention.

Any wear that may arise due to the engagement between the pins 76 and the slots 70 can be minimized by coating at least a portion of the slot 70 with a wear resistant material 71, as is shown in FIGS. 3 and 5D. In addition or alternatively, the pins 70 can also be coated with a wear resistant material 71, as is shown in FIG. 5D. Similarly, the wear resistant coating 71 can be applied to the contacting surfaces of the ring seal 52 and the isolation rings 44, 46.

According to aspects of the invention, the ring seal 52 can be positioned so that the slots 70 are substantially aligned with the openings 84 in the isolation rings 44, 46. Thus, each pin 76 can pass through one of the slots 70 in the ring seal 52 and engage both of the isolation rings 44, 46. The ring seal 52 can operatively engage the isolation rings 44, 46 in various ways. In one embodiment, the forward isolation ring 44 can be located axially upstream of the upstream surface 60 of the ring seal 52; the aft isolation ring 46 can be located axially downstream of the downstream surface 62 of the ring seal 52. For example, as shown in FIG. 5A, the aft surface 50 of the forward isolation ring 44 can face opposite the upstream surface 60 of the ring seal 52, and the downstream surface 62 of ring seal 52 can face opposite the forward surface 48 of the aft isolation ring 46.

In an alternative arrangement, the forward isolation ring 44 can be located axially upstream of the upstream surface 60 of the ring seal 52, and the aft isolation ring 46 can be located axially upstream of the downstream surface 62 of the ring seal 52. For instance, as shown in FIG. 5B, the forward surface 60 of the forward span 64 can face opposite the aft surface 50 of the forward isolation ring 44, and the upstream surface 67 of the aft span 66 can face opposite the aft surface 50 of the aft isolation ring 46. In such an arrangement, the pins 76 can extend through the aft span 66, the aft isolation ring 44, the forward span 64 and at least partly into the forward isolation ring 44. The head 82 of the pin 76 operatively engages the downstream surface 62 of the ring seal 52. For instance, the head 76 can directly bear against the downstream surface 62, or a washer (not shown) or other fastener can be positioned between the head 82 of the pin 76 and the downstream surface 62 of the ring seal 52.

In yet another alternative arrangement, the forward isolation ring 44 can be located axially downstream of the upstream surface 60 of the ring seal 52, and the aft isolation ring 46 can be located axially downstream of the downstream surface 62 of the ring seal 52. For instance, as shown in FIG. 5C, the aft surface 65 of the forward span 64 can face opposite the forward surface 48 of the forward isolation ring 44, and the downstream surface 62 of the ring seal 52 can face opposite the forward surface 48 of the aft isolation ring 46. In such an arrangement, the pins 76 can extend through the forward isolation ring 44 and at least partly into the slot 70 in the forward span 64 of the ring seal 52.

The first embodiment of the attachment system according to aspects of the invention allows radial movement of the ring seal 52, while substantially restricting circumferential and axial movement. The circumferential restraint provided by the pins 76 can prevent the ring seal 52 from dropping due to gravity or from shifting to the left or right. In some arrangements, such as those shown in FIGS. 5A and 5C, axial movement of the ring seal 52 can be substantially restricted by isolation rings 44, 46. In particular, the aft isolation ring 46 can provide the axial restraint because, during engine operation, the hot gases traveling through the turbine section 16 can force the ring seal 52 axially downstream and into engagement with the aft isolation ring 46. In the case of the arrangement shown in FIG. 5B, axial restraint can be provided by the head 82 of the pin 76. As noted earlier, the ring seal 52 can be made of a plurality of ring segments 54. There can be any number of segments 54 as long as the segments 54 can cooperate to substantially restrict all non-radial movement and rotation.

Again, the outer casing 32, the vane carrier 40 and the ring seal 52 are substantially ring-shaped in cross-section. Therefore, in response to an increase in temperature, these components will grow radially outward. According to aspects of the invention, the ring seal 52 is permitted to radially expand and contract independently of the outer casing 32 and the vane carrier 40. Though relative radial motion is allowed, the slot 70 and pin 76 configuration can provide a sufficient structural connection between the vane carrier 40 and the ring segment 52.

It will be appreciated that the attachment system according to the first embodiment of the invention can result in appreciable time savings during installation of the ring seal 52. Similarly, time can be saved in the removal of the ring seal 52. To remove the ring seal 52 or at least one of the individual ring segments 54, the pins 76 can be removed and the segment 54 can be removed from the vane carrier 40. The vane carrier 40 may need to be removed from the engine prior to assembly or removal of the ring seal 52. The attachment system according to aspects of the invention can be applied in new engine designs, and it can be retrofitted in existing engines.

Figure 6:
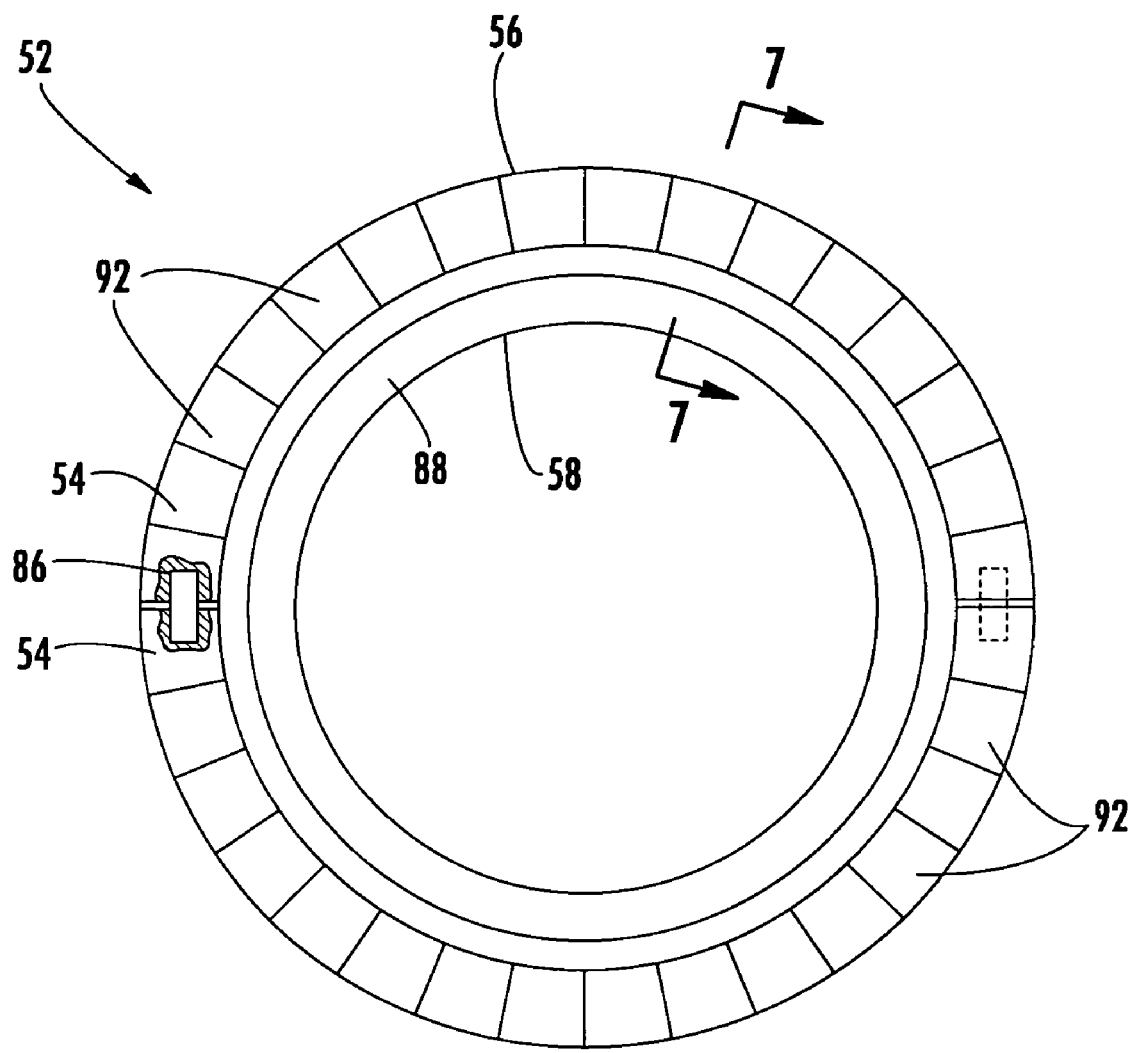
FIG. 6 is an elevational view partially broken away of a ring seal according to a second embodiment of the invention.
Figure 7:
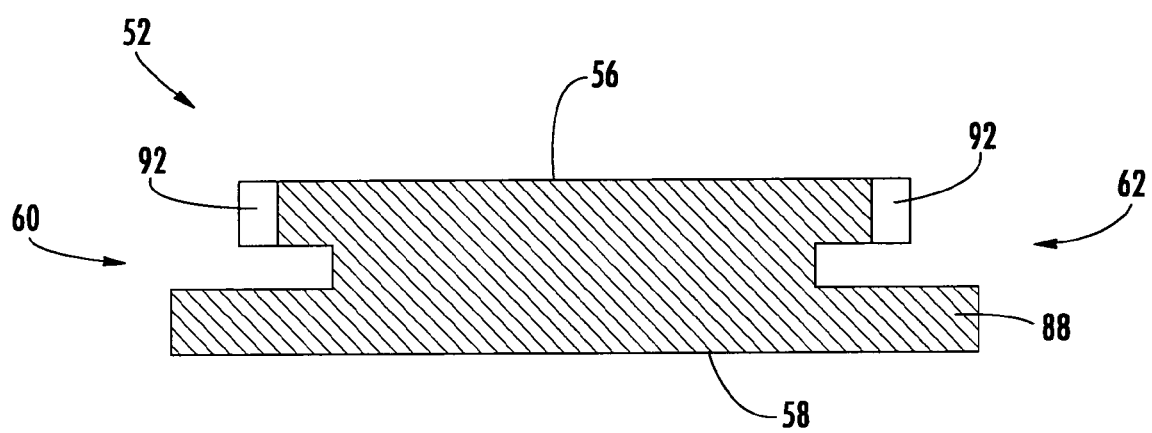
FIG. 7 is a cross-sectional view of the ring seal of according to the second embodiment of the invention, viewed from line 7-7 in FIG. 6.
Figure 8:
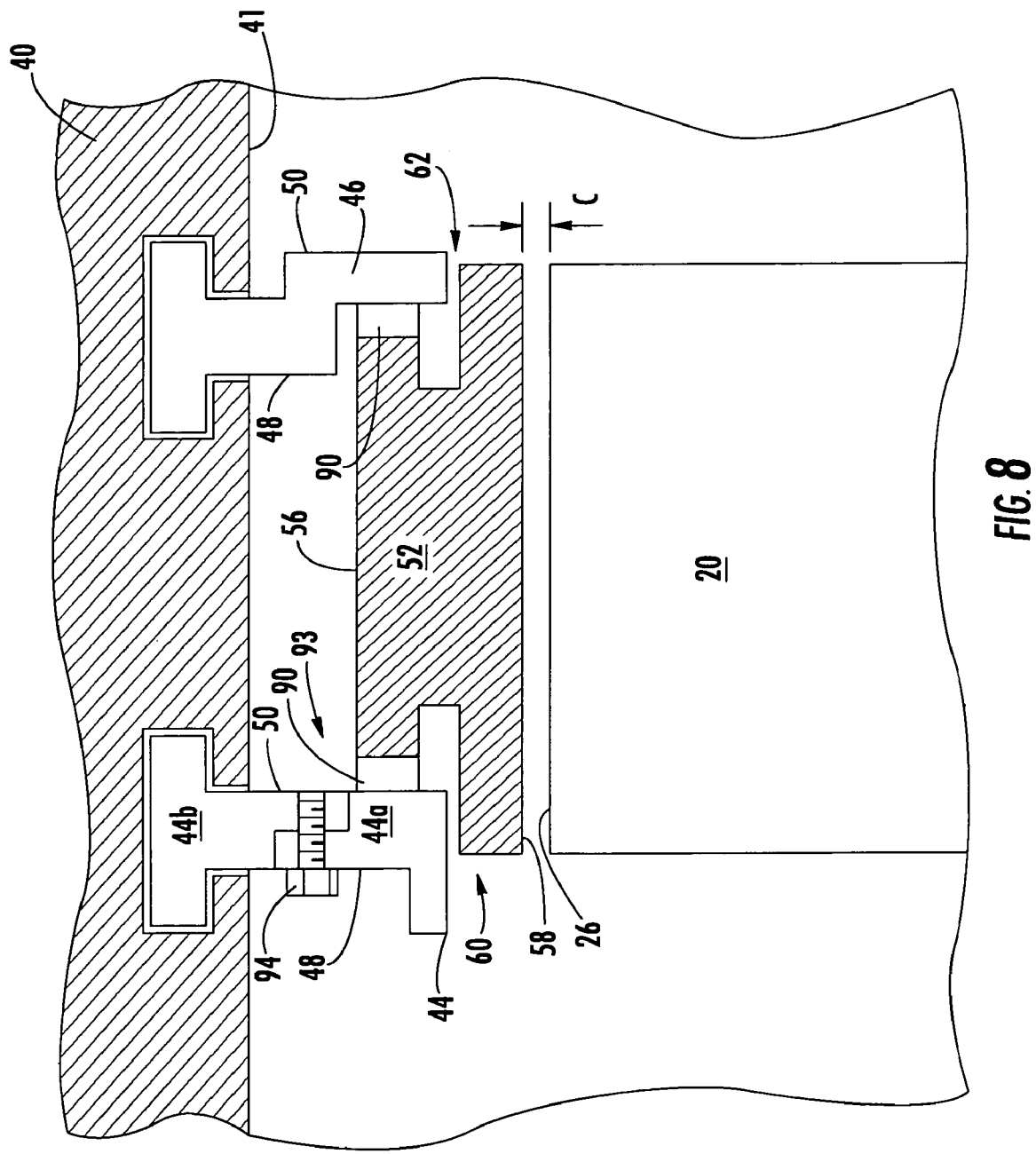
FIG. 8 is a cross-sectional view of a ring seal attachment system according to the second embodiment of the invention.

Another embodiment of a ring seal attachment system according to aspects of the invention is shown in FIGS. 6-8. The system includes a vane carrier 40 having an inner peripheral surface 41. The vane carrier 40 can provide a forward isolation ring 44 and an aft isolation ring 46. The earlier discussion of these components applies equally here.

Further, each of the isolation rings 44, 46 can be equipped with a plurality of substantially axially extending protrusions 90. The protrusions 90 can extend substantially circumferentially (that is, substantially 360 degrees) around each isolation ring 44, 46. Preferably, the protrusions 90 are substantially equally spaced about each isolation ring 44, 46. In one embodiment, the protrusions 90 can be provided on the aft surface 50 of the forward isolation ring 44 as well as on the forward surface 48 of the aft isolation ring 46. However, the protrusions 90 can be provided on other surfaces on the isolation rings 44, 46 or on different combinations of surfaces on the isolation rings 44, 46.

The protrusions 90 can have any of a number of configurations. For instance, the protrusions 90 can be substantially rectangular, but other conformations, such as triangular, are possible. In one embodiment, the protrusions 90 can be configured as gear-like teeth. There can be any number of protrusions 90. Each of the protrusions 90 can be substantially identical, or one or more of the protrusions 90 can be different from the other protrusions 90 in terms of size and shape. The protrusions 90 can be provided in the isolation rings 44, 46 by, for example, machining.

The system can include a ring seal 52. It is noted that FIG. 6 shows the ring seal 52 as being made of two ring segments 54 that are substantially circumferentially adjacent to each other. In one embodiment, the segments 54 can be joined by, for example, fasteners 86. The ring seal 52 can have a radial outer periphery 56 and a radial inner periphery 58. The outer periphery 56 can be defined by a flange 88. According to aspects of the invention, the upstream surface 60 and the downstream surface 62 of the ring seal 52 can include a plurality of protrusions 92 extending substantially axially therefrom. In addition, the protrusions 92 can extend substantially circumferentially (that is, substantially 360 degrees) around each surface 60, 62 of the ring seal 52. The foregoing description of the protrusions 90 in connection with the isolation rings 44, 46 is equally applicable to the protrusions 92. In one embodiment, the protrusions 92 on the ring seal 52 can be located at or near the outer periphery 56 of the ring seal 52.

The protrusions 92 on the ring seal 52 and the protrusions on the isolation rings 44, 46 can be configured to substantially matingly engage each other. In a preferred embodiment, the protrusions 90, 92 are configured as a Hirth coupling 93. The ring segment 52 can be positioned such that the protrusions 92 on the upstream and downstream surfaces 60, 62 thereof substantially matingly engage the protrusions 90 provided on the isolation rings 44, 46. In one embodiment, the protrusions 92 on the upstream face 60 of the ring seal 52 can substantially matingly engage the protrusions 90 on the aft surface 50 of the forward isolation ring 44. Similarly, the protrusions 92 on the downstream face 62 of the ring seal 52 can substantially matingly engage the protrusions 90 of the forward surface 48 of the aft isolation ring 46.

To facilitate the installation and removal of the ring seal 52, at least one of the isolation rings 44, 46 can be made of two or more portions. For instance, as shown in FIG. 8, the forward isolation ring 44 can be formed by two portions 44a, 44b joined together by, for example, a bolt 94 or other fastener. The bolt 94 can also be used to keep the ring seal 52 compressed between the two isolation rings 44, 46.

It will be appreciated that axial and circumferential movement of the ring seal 52 is substantially restrained because of the substantially matingly engagement of the protrusions 90, 92, as described above. However, it will also be appreciated that the same arrangement does not prohibit relative radial motion of the ring seal 52 and isolation rings 44, 46. Thus, during engine operation, the differential rates of thermal expansion and contraction of the ring seal 52 and the vane carrier 40 and/or outer casing (not shown) can be accommodated. Thus, any radial movement of the isolation rings 44, 46 and/or the vane carrier 40 does not substantially affect the radial position and movement of the ring seal 52. However, the isolation rings 44, 46 and the ring seal 52 are structurally connected.

Further, the substantially mating engagement of the protrusions 90, 92 can allow the ring seal 52 to be substantially self-centering on the vane carrier 40. During engine operation, there may be instances in which at least a portion of the ring seal 52 becomes radially unseated from its engagement with the vane carrier 40, such as due to vibration. However, with the protrusions 90, 92 being configured to be substantially matingly engaging, the ring seal 52 can be substantially centered on the vane carrier 40 when the ring seal 52 reseats itself. Thus, aspects of the invention can minimize the need for systems to actively maintain the ring seal 52 centered on the vane carrier 40.

Figure 9:
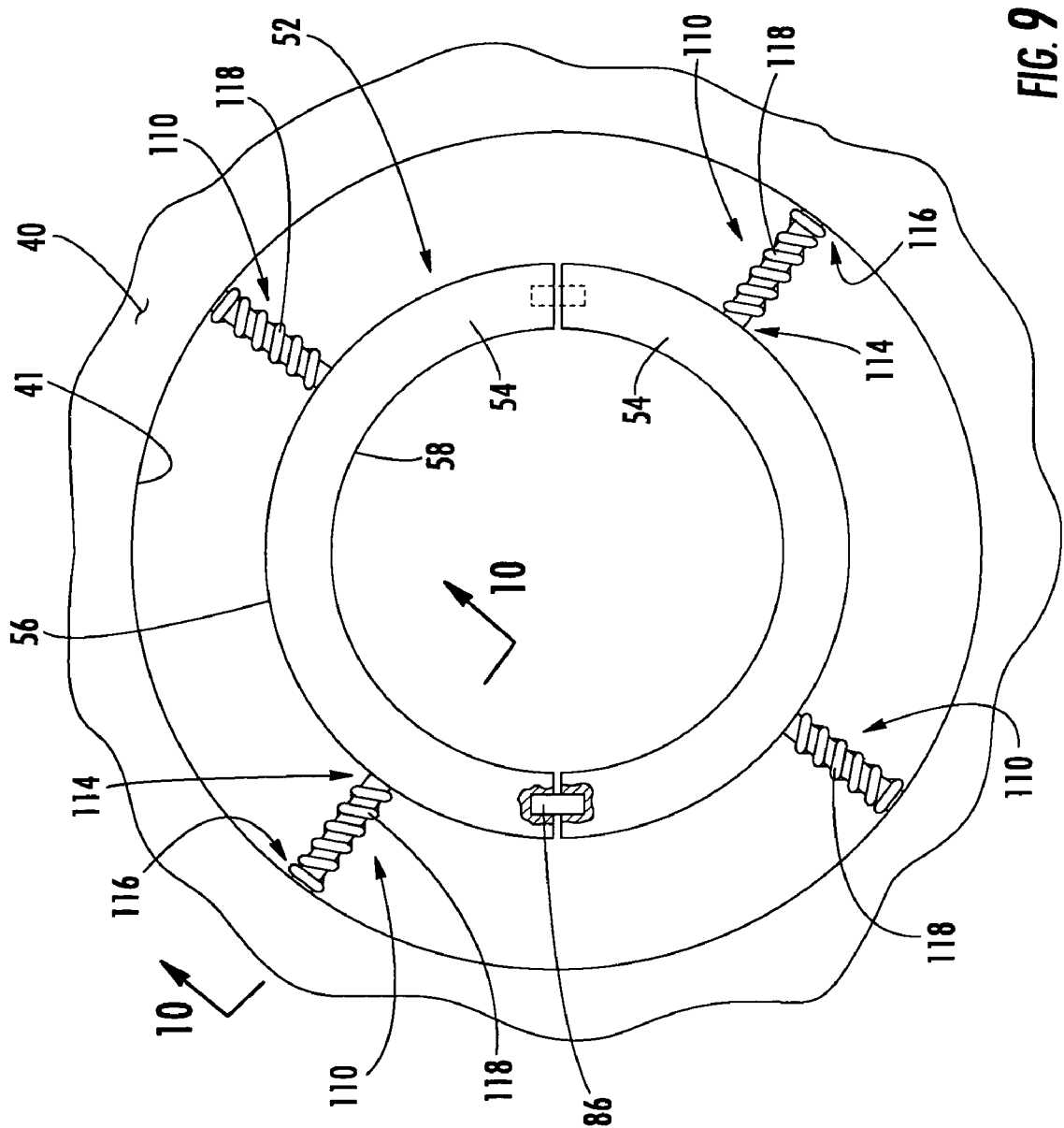
FIG. 9 is an elevational view partially broken away of a ring seal attachment system according to a third embodiment of the invention.
Figure 10:
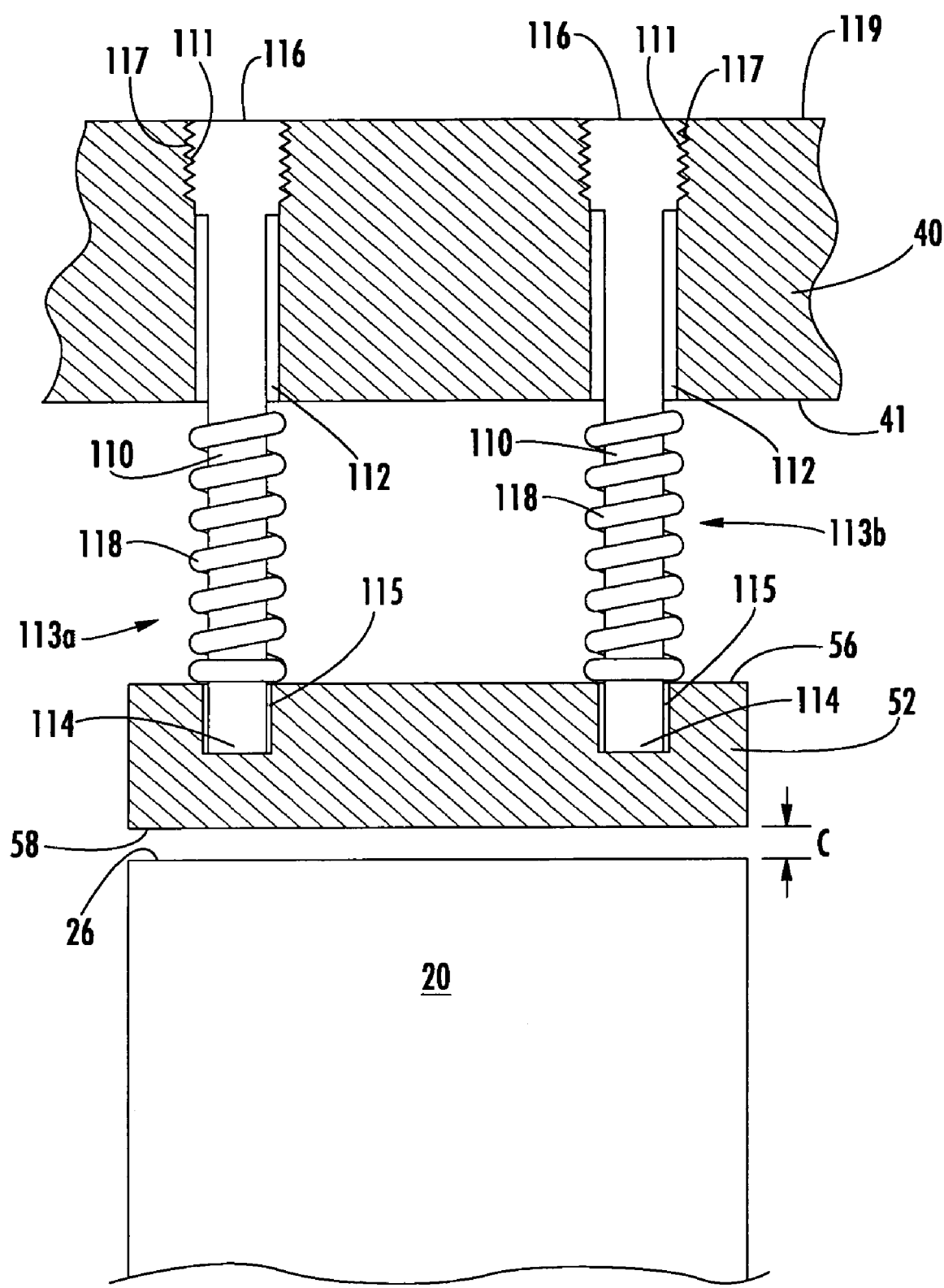
FIG. 10 is a cross-sectional view of the ring seal attachment system according to the third embodiment of the invention, viewed from line 10-10 in FIG. 9.

Another attachment system according to aspects of the invention is shown in FIGS. 9-10. According to aspects of the invention, the vane carrier 40 and the ring seal 52 can be operatively connected by a plurality of radial pins 110. The pins 110 can operatively engage the vane carrier 40 and the ring seal 52.

Each pin can have a first end 114 and a second end 116. The pins 110 can be substantially straight. The pins 110 can have almost any cross-sectional geometry. In one embodiment, the pins 110 can be substantially circular, but they can also be, for example, substantially oval, rectangular, triangular and polygonal. At least a portion of each pin can be adapted for operative engagement with the ring seal 52 and/or the vane carrier 40, as will be explained in greater detail below. In one embodiment, a portion of each pin 110 can be threaded 111. Each of the plurality of pins 110 can be identical, or at least one of the pins 110 can be different from the other pins 110 in one or more respects.

The vane carrier 40 can be adapted for operative engagement with each pin 110. For instance, the vane carrier 40 can include a plurality of passages 112. The passages 112 can extend radially outward from the inner peripheral surface 41 of the vane carrier 40, as shown in FIG. 10. The passages 112 can extend substantially radially through the vane carrier 40. At least a portion of a pin 110 can be received in the passage 112. Ideally, the passages 112 and the pins 110 are closely toleranced to minimize axial and circumferential movement of the pins 110 within the passages 112.

In one embodiment, the pins 110 and the vane carrier 40 can be connected to each other. For example, at least a portion of the passages can include threads 117 to engage the threads 111 provided at or near the first end 114 of each of the pins 110, as shown in FIG. 10. In such an arrangement, it will be appreciated that the pins 110 can be inserted and removed from the vane carrier 40 from the radially outer surface 119 of the vane carrier 40. Again, threaded engagement is only one of several ways in which the pins 110 can operatively engage the vane carrier 40, and aspects of the invention are not limited to threaded engagement. The second end 116 of the pins 110 can extend radially inward from the inner peripheral surface 41 of the vane carrier 40.

A plurality of recesses 115 can be provided in the ring seal 52. In particular, the recesses 115 can extend radially inward from the outer periphery 56 of the ring seal 52. The recesses 115 and the passages 112 can be provided in the ring seal 52 and the vane carrier 40, respectively, using various conventional machining techniques. The pins 110 can engage the recesses 115 in various ways. For example, each recess 115 can receive a portion of a pin 110 including the second end 116. The pins 110 can be free to move radially within the recess 115. However, it is preferred if the pins 110 are substantially restricted from moving axially and circumferentially in the recesses 115, which would cause the ring seal 52 to move axially and circumferentially. For example, the recesses 115 can be sized and shaped so as to be closely toleranced with the pins 110 to thereby minimizing axial and circumferential movement of the pins 110 in the recess 115. The ring seal 52 can be removed from the vane carrier 40 by removing the pins 110.

There can be any number of recesses 115. The recesses 115 can be arranged in various ways. For instance, the recesses 115 can be substantially equally spaced circumferentially about the ring seal 52 and the vane carrier 40. In some instances, one or more recesses 115 can be unequally spaced from the other recesses 115. Further, the recesses can be substantially aligned 115 in a row about each component. Alternatively, one or more of the recesses 115 can be axially offset from the other recesses 115. There can be two or more rows of recesses 115. FIG. 10 shows an embodiment in which there is a first row of recesses 113a and a second row of recesses 113b. The arrangement of the recesses 115 in the first row 113a may or may not be substantially identical to the arrangement of the recesses 115 in the second row 113b. Each recess 115 in the ring seal 52 can be substantially aligned with one of the passages 112 in the vane carrier 40.

One or more radial springs can be operatively associated with each pin 110 such that the pins 110 are spring loaded. In one embodiment, the radial springs can be coiled springs 118, which operatively engage the ring seal 52 and the vane carrier 40. The pins 110 can pass through each coiled spring 118. The radial springs can provide a substantially steady load against the ring seal 52. The radial springs can keep the ring seal 52 substantially centered and may be able to minimize vibrations. The radial springs can also overcome any friction between the pin 110 and the recesses 115 so that radial growth is not substantially impeded. It will be readily appreciated that the pins 110 according to aspects of the invention can axially and circumferentially restrain the ring seal 52. However, the radial pins 110 permit differential thermal growth between the ring seal 52 and the vane carrier 40.

As noted above, each of the embodiments of the attachment system according to aspects of the invention can facilitate the optimization of the operational blade tip clearances C by allowing the ring seal 52 to radially grow and contract independently of the vane and/or the outer casing 42. When a pinch point occurs during engine operation, only the further radial growth of the ring seal 52 can increase the clearance C between the inner periphery 58 of the ring seal 52 and the tips 26 of a neighboring row of blades 20. The clearance C is substantially unaffected by radial growth of the vane carrier 40 and/or the outer casing 32, which may thermally expand at a slower rate than the ring seal 52 because of their relatively large thickness compared to the ring seal 52. To further take advantage of the separation of the vane carrier 40 and the ring seal 52, the ring seal 52 can made of a material with a low coefficient of thermal expansion (at least compared to the vane carrier 40 and the outer casing 32).

Again, only the thermal growth of the ring seal 52 can enlarge the operating clearance C. Such growth will be much less than the overall outward radial movement of the ring seal 34 in the known attachment system in which the ring seal 34 can be moved radially outward by its attachment to the vane carrier 28 and outer casing 32 assembly. Thus, according to aspects of the invention the clearances C can be minimized purely from the geometry and the thermal properties of the ring seal 52. The attachment systems according to aspects of the invention can minimize or eliminate the need for control systems to monitor the tip clearances, or hydraulics or pressure systems to actively adjust the clearances.

Because it is like a thin hoop, the ring seal 52 will respond much quicker to the initial firing of the engine, resulting in a faster thermal growth rate which can change the time at which the pinch point occurs. Postponement of the pinch point can reduce the concerns associated with pinch points. Potentially, the pinch point would be delayed until steady state engine operation, which would be the ideal operational condition for having minimal blade tip clearances C. At steady state, the thermal expansion of the stationary and rotating components that establish the blade tip clearance C has substantially stabilized, so that concerns of blade tip rubbing are reduced. Minimized blade tip clearances C at steady state engine operation, such as base load, would increase engine performance and efficiency.

The foregoing description is provided in the context of various possible systems for attaching a ring seal and a vane carrier in a turbine engine. It will of course be understood that the invention is not limited to the specific details described herein, which are given by way of example only, and that various modifications and alterations are possible within the scope of the invention as defined in the following claims.

What is claimed is:

1. An attachment system comprising:
   a vane carrier having an inner peripheral surface;
   a forward isolation ring and an aft isolation ring spaced axially downstream of the forward isolation ring, wherein the isolation rings are attached to the vane carrier such that the isolation rings extend substantially circumferentially about and substantially radially inward from the inner peripheral surface of the vane carrier;
   a ring seal having a radially outermost periphery and a radially innermost periphery, the ring seal having a plurality of substantially circumferentially spaced slots, wherein the slots extend substantially axially through the ring seal, wherein each slot opens to a surface of the radially outermost periphery of the ring seal and extends radially inward therefrom; and
   a plurality of pins, wherein each of the plurality of pins substantially passes through a respective slot in the ring seal and operatively engages the forward and aft isolation rings,
   whereby the ring seal is structurally connected to the vane carrier by the isolation rings and the pins so that axial and circumferential movement of the ring seal is substantially restricted while relative radial movement between the ring seal and the vane carrier is permitted.

2. The system of claim 1 wherein at least one of the slots and the pins is at least partially coated with a wear resistant material.

3. The system of claim 1 wherein each of the isolation rings includes a plurality of circumferentially spaced holes, wherein the holes in the forward isolation ring are substantially aligned with the holes in the aft isolation ring, wherein the ring seal is positioned such that each slot is substantially aligned with a pair of aligned holes in the isolation rings, and wherein each pin is received within the aligned holes of the isolation rings.

4. The system of claim 1 wherein the ring seal includes a forward span, an aft span and an axial extension connecting the forward and aft spans, and wherein the axial extension defines at least a part of the radially innermost periphery of the ring seal, wherein the forward span, the aft span and the axial extension collectively form a substantially U-shaped cross-section that opens in a generally radially outward direction toward the vane carrier.

5. The system of claim 4 wherein each of the isolation rings includes an axial upstream surface and an axial downstream surface, and each of the spans of the ring seal includes an axial forward surface and an axial aft surface, the ring seal being positioned such that the downstream surface of the forward isolation ring opposes the forward surface of the forward span, and such that the aft surface of the aft span opposes the upstream surface of the aft isolation ring,
   and wherein each pin includes a first end with a head and a second end, wherein the head of each pin operatively engages one of the aft face of the aft isolation ring and the forward face of the forward isolation ring, and wherein the second end of the pin is operatively connected to the other of the forward isolation ring and the aft isolation ring.

6. The system of claim 4 wherein each of the isolation rings includes a forward face and an aft face, and each of the spans of the ring seal includes a forward face and an aft face, the ring seal being positioned such that the forward face of the forward span opposes the aft face of the forward isolation ring, and such that the forward face of the aft span opposes the aft face of the aft isolation ring, and wherein each pin includes a first end with a head and a second end, wherein the head of each pin operatively engages the aft face of the aft span and the second end of the pin is operatively connected to the forward isolation ring.

7. The system of claim 4 wherein each of the isolation rings includes a forward face and an aft face, and each of the spans of the ring seal includes a forward face and an aft face, the ring seal being positioned such that the aft face of the forward span opposes the forward face of the forward isolation ring, and such that the aft face of the aft span opposes the forward face of the aft isolation ring, and wherein each pin includes a first end with a head and a second end, wherein the head of each pin operatively engages the aft face of the aft isolation ring, and wherein the second end of the pin extends through the forward isolation ring and at least partly into one of the slots in the ring seal.

8. The system of claim 1 wherein the ring seal and the vane carrier are each made of a material with an associated coefficient of thermal expansion, wherein the coefficient of thermal expansion of the ring seal is less than the coefficient of thermal expansion of the vane carrier.

9. The system of claim 1 wherein the ring seal is made of ceramic.

10. An attachment system comprising:

a vane carrier, wherein the vane carrier has an inner peripheral surface;

a forward isolation ring and an aft isolation ring spaced axially downstream of the forward isolation ring, wherein the isolation rings are attached to the vane carrier such that the isolation rings extend substantially circumferentially about and radially inward from the inner peripheral surface of the vane carrier, wherein a plurality of protrusions extend substantially axially from and substantially circumferentially about each of the isolation rings;

a ring seal enclosed within the vane carrier, the ring seal having an axial forward side and an axial aft side, and wherein a plurality of protrusions extend substantially axially from and substantially circumferentially about each axial side of the ring seal, wherein the ring seal is operatively connected to the vane carrier such that the protrusions on the axial forward side of the ring seal substantially matingly engage the protrusions on the forward isolation ring, and wherein the protrusions on the axial aft side of the ring seal substantially matingly engage the protrusions on the aft isolation ring, whereby the vane carrier and the ring seal move at least partially independent of each other in the radial direction.

11. The system of claim 10 wherein at least one of axial movement and circumferential movement of the ring seal is substantially restricted.

12. The system of claim 10 wherein the ring seal is made of ceramic.

13. The system of claim 10 wherein the ring seal and the vane carrier are each made of a material with an associated coefficient of thermal expansion, wherein the coefficient of thermal expansion of the ring seal is less than the coefficient of thermal expansion of the vane carrier.

14. The system of claim 10 wherein the substantially matingly engaging protrusions of the ring seal and the isolation rings are configured as a Hirth coupling.

15. The system of claim 10 wherein the isolation rings are adapted to apply a clamping force on the ring seal.

16. The system of claim 10 wherein each of the forward and aft isolation rings includes a front face and an aft face, wherein the plurality of protrusions are provided on the aft face of the forward isolation ring and the front face of the aft isolation ring.

* * * * *